United States Patent
Lotspiech et al.

[11] Patent Number: 5,946,473
[45] Date of Patent: Aug. 31, 1999

[54] LFSR IMPLEMENTATION USING SPLIT-TABLE LOOKUP

[75] Inventors: Jeffrey Bruce Lotspiech, San Jose, Calif.; James Hugh Morgan, Ossining, N.Y.

[73] Assignee: International Business Machines Corporation, Armonk, N.Y.

[21] Appl. No.: 08/877,121

[22] Filed: Jun. 17, 1997

[51] Int. Cl.⁶ .................................................. G06F 19/00
[52] U.S. Cl. ............................. 395/500; 364/578; 377/72
[58] Field of Search ............................ 395/500; 364/578; 377/72; 371/22.32

[56] References Cited

U.S. PATENT DOCUMENTS

| | | | |
|---|---|---|---|
| 5,073,909 | 12/1991 | Kotzin et al. | 377/72 |
| 5,097,428 | 3/1992 | Crosby | 364/554 |
| 5,270,981 | 12/1993 | Sumi | 365/221 |
| 5,479,414 | 12/1995 | Keller et al. | 371/22.3 |
| 5,724,383 | 3/1998 | Gold et al. | 375/208 |
| 5,784,427 | 7/1998 | Bennett et al. | 377/72 |

OTHER PUBLICATIONS

"Software Pseudo–Random Number Generator Without Replacement", IBM Technical Disclosure Bulletin, vol. 35, No. 1B, pp. 159–160, Jun. 1992.

"Parallel CRC Generation", Guido Albertengo & Riccardo Sisto, IEEE Micro, pp. 63–71, Oct. 1990.

"Byte–wise CRC Calculations", Aram Perez, Wismer & Becker, IEEE Micro, pp. 40–50, Jun. 1983.

*Primary Examiner*—Kevin J. Teska
*Assistant Examiner*—A. S. Roberts
*Attorney, Agent, or Firm*—Gray Cary Ware & Freidenrich

[57] ABSTRACT

A linear feedback shift register (LFSR) of interest is modelled in software by replicating the LFSR in at least two identically configured model LFSRs. One model LFSR contains only the higher order initial bits of the LFSR of interest, with zeroes in the lower order bit positions, and the other model LFSR has only the lower order bits, with zeroes in the higher order bit positions. The model LFSRs are represented by respective tables of model LFSR output values that would be produced after a predetermined number of register shifts. The tables are accessed based on the initial value of the LFSR of interest, and the results of one table are combined with the results of the other table using an exclusive OR operator to thereby determine the output of the LFSR of interest. The table lookup method results in increased speed vis-a-vis the performance of single-bit-per-cycle LFSRs, while the use of two logical model LFSRs with corresponding tables permits duplicative entries to be ignored when indexing the tables, thus greatly reducing the space required to store the tables.

30 Claims, 2 Drawing Sheets

LFSR IMPLEMENTATION USING SPLIT-TABLE LOOKUP

BACKGROUND OF THE INVENTION

1. Field of the Invention

The present invention relates generally to linear feedback shift registers (LFSRs), and more particularly to an efficient implementation of an LFSR using split-table lookup.

2. Description of the Related Art

A shift register is a device used in digital logic systems to store and shift multi-bit units of information in synchronization with the pulses of a clock signal. It is an m-cell device whose cells are linked serially, output-to-input. An m-bit digital word may be shifted left or right by one bit position with each clock pulse. Following each shift, an end bit (the "output" bit) of the word is lost, having been shifted out of the register's last cell, while a new bit (the "input" bit) has been added to the appropriate end of the word through the first cell of the register. Following each shift, the entire word in the register may be obtained by parallel access to the outputs of the cells.

Linear feedback shift registers (LFSRs) are shift registers through which binary data moves serially. As is the case with shift registers in general, during each cycle of data transfer, an input bit is fed into the first cell of the LFSR, and each bit in the LFSR shifts down one cell. The bit in the last cell is shifted out of the LFSR as an output bit. In practice, when referring to the number of cells in an LFSR, the term "number of bits" is often used to convey the same meaning.

In contrast to other types of shift registers, however, the input to an LFSR generally is a combination of its output bit and one or more of the bits in predetermined cells (referred to as "taps") of the register, with the combination being fed back as the next input bit. For example, the bits to be combined may be compared using what is referred to as an "exclusive OR" operation, in which a binary zero results from the combination when the bits are of equal value, and a binary one results when the bits are unequal. It happens that with this structure, LFSRs are useful for many applications, such as cyclic redundancy check (CRC) circuits that are used to detect errors in digital transmissions, and pseudorandom number generators used in cryptology, digital video disks, and digital wireless telephones.

In certain of the above-mentioned applications, and particularly for digital video disk (DVD) applications, it is often desirable to undertake the LFSR functions quickly by using a software implementation of the LFSR for enhanced system flexibility and to facilitate the high rates at which data must be transferred in DVDs.

SUMMARY OF THE INVENTION

Accordingly, this invention is based upon implementation of an LFSR in a computer program that uses a table look-up to determine what the output of an LFSR would be after a predetermined number of shift cycles, starting with a known register content of the LFSR, that would render a result in one cycle what a counterpart LFSR implemented in hardware might take many cycles to render.

However, while such a table look up scheme provides much greater speed than can a single-bit-per-cycle LFSR, it would require an excessively large data storage space. For example, an LFSR of twenty or more bits, could require a lookup table of a size in excess of a megabyte. Nevertheless, this invention provides a software implementation of an LFSR that reduces table size, thereby reducing the data storage space required to store an LFSR result table.

Accordingly, it is an object of the present invention to provide an LFSR implemented in a computer program that reduces table size. Another object of the present invention is to provide a software implementation of an LFSR that can be used to quickly determine the results of a predetermined number of shifts in the LFSR. Yet another object of the present invention is to provide a software implementation of an LFSR that does not require excessively large lookup tables. Still another object of the present invention is to provide a software implementation of an LFSR that is easy to use and cost-effective.

The invention includes a general purpose digital computer programmed according to the inventive steps herein to implement the operations of a linear feedback shift register (LFSR). The invention can also be embodied as an article of manufacture—a machine component—used by a digital processing apparatus, and tangibly embodying a program of instructions that are executable by the digital processing apparatus to implement the operations of an LFSR. This invention is also realized in a critical machine component that causes a digital processing apparatus to perform the inventive method steps herein.

In accordance with the present invention, an LFSR, designated "A", has a predetermined logical configuration. According to this invention, the method steps include generating data representations of at least two model LFSRs denominated the "B LFSR" and the "C LFSR", respectively, with each model LFSR having the same logical configuration as the A LFSR. As disclosed in detail below, the B LFSR contains a subset B of bits of the A LFSR, and the C LFSR contains a subset C of bits of the A LFSR. Using the model LFSRs, B and C tables are generated. The B table represents at least the output of the B model LFSR after a predetermined number n of register shifts, and the C table represents at least the output of the C model LFSR after the predetermined number n of register shifts. The B table and the C table are accessed to retrieve a B output value and a C output value. These output values are combined to render a modelled output of the A LFSR.

Preferably, the B and C tables are accessed based on an initial value representing an initial state of the A LFSR. Additionally, the B output value is combined with the C output value using a bit-wise exclusive OR operation. In one preferred embodiment, the subset B includes higher order bits of the A LFSR, while the subset C includes lower order bits of the A LFSR. Also preferably, the number of bits in the B LFSR is equal to the number of bits in the C LFSR, which minimizes the sizes of the tables. When the number of bits in the A LFSR is odd, the number of bits in the B LFSR preferably is no more than one (1) more or less than the number of bits in the C LFSR.

In one preferred embodiment a computer includes a main storage, a cache and a main memory, and a sufficient number of model LFSRs are generated such that tables corresponding to the model LFSRs can all be stored in the data cache and accessed without requiring the accessing of the main storage. The computer is disclosed in combination with a digital video disk device.

In another aspect, a method is disclosed for determining an output of an A linear feedback shift register (LFSR). The method includes producing a data table that represents all possible states of the A LFSR, and then partitioning the table to produce at least a B replicate of the A LFSR and a C replicate of the A LFSR, with each replicate including at least a subset of the bits of the A LFSR The B and C replicates are lookup tables that contain representations of portions of A LFSR states. To obtain a representation of an A LFSR output, an output of the B replicate is combined with an output of the C replicate using a bitwise exclusive OR operation, which yields the output of the A LFSR.

In another aspect of the present invention, a computer program product is disclosed which is readable by a digital processing apparatus and which tangibly embodies a computer program. The computer program product combines a computer readable medium with program code elements that determine the output of an A linear feedback shift register (LFSR) defining a configuration including a number of bits, and having an initial LFSR value.

In this invention, the code elements are embodied in a program stored on the computer readable medium. These code elements include computer readable code means for replicating the A LFSR in software to generate a plurality of logical model LFSRs, with each model LFSR having a respective subset of bits of the A LFSR. Code means are also provided for generating respective data tables based on the logical model LFSRs. Each data table represents model output values of the respective logical model LFSR after a predetermined number of shifts. Moreover, code means determine the output of the A linear feedback shift register based on the model output values.

In yet another aspect, a computer includes computer readable instructions that are executable by the computer for performing method steps for determining the output of a linear feedback shift register (LFSR). The LFSR defines a configuration having a number of bits, and has one of a plurality of initial LFSR values, with each value being defined by a respective sequence of at least first bit values and second bit values.

In accordance with the present invention, the method steps include, for each initial LFSR value, replacing the values of the first bits with zeroes to establish first model values. Then, the method steps determine first outputs of the LFSR for each first model value. Only non-duplicative first outputs are stored in a first table. Also, for each initial LFSR value, the values of the second bits are replaced with zeroes to establish second model values, and second outputs of the LFSR are determined for each second model value. Only non-duplicative second outputs are stored in a second table. The method steps then include determining the output of the LFSR by accessing the first table to retrieve a first test output, accessing the second table to retrieve a second test output, and undertaking a bitwise exclusive OR operation on the first and second test outputs.

The details of the present invention, both as to its structure and operation, can best be understood in reference to the accompanying drawings, in which like reference numerals refer to like parts, and in which:

DETAILED DESCRIPTION OF THE PREFERRED EMBODIMENTS

Figure 1:
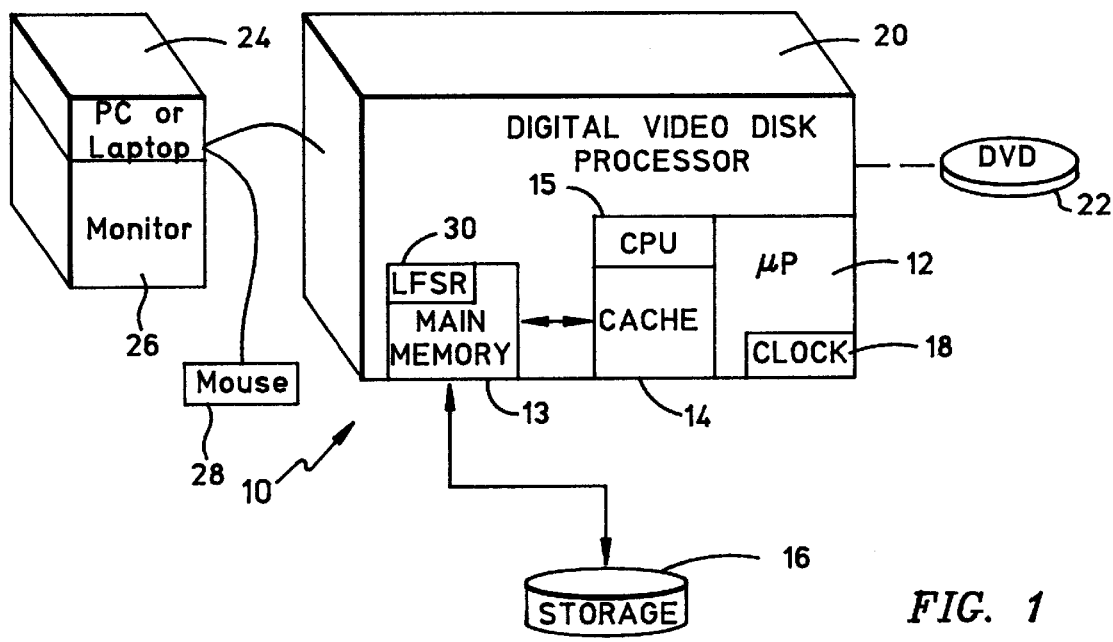
FIG. 1 is a schematic view of one system implementation of the LFSR module, shown in a digital video disk (DVD) system.

Referring initially to FIG. 1, a system for quickly and efficiently determining the output of a linear feedback shift register (LFSR) is shown, generally designated 10. In the particular architecture shown, the system 10 includes a digital processing apparatus, such as a microprocessor 12 (or computer), for example the processor made by Intel Corp. and marketed under the trademark Pentium®. In accordance with principles known in the art, the microprocessor 12 includes a data cache 14 and a CPU 15. The microprocessor 12 operates in conjunction with a main memory 13. As is known, the cache 14 stores data in a high speed semiconductor memory for rapid access by the CPU 15. The microprocessor 12 also includes a clock 18 for generating clock cycle signals. A backing storage 16 is provided for reference storage of data.

As shown in FIG. 1, in one application the microprocessor 12 can be incorporated into a digital video disk (DVD) processor 20, for storing and retrieving data from a digital video disk 22. In turn, the DVD processor 20 can be associated with a personal computer (PC) or laptop computer 24 for presenting, on a monitor 26 of the PC or laptop computer 24, video images that are stored on the DVD 22. In one intended embodiment, the PC or laptop computer 24 may be a personal computer made by International Business Machines Corporation (IBM) of Armonk, N.Y. Alternatively, the computer 24 may be any computer, including computers sold under trademarks such as AS400, with accompanying IBM Network Stations. Or, the computer 24 may be a Unix computer, or OS/2 server, or Windows NT server, or IBM RS/6000 250 workstation. An input device, such as a mouse 28, is also associated with the PC or laptop computer 24. Input devices other than the mouse 28 can be used, e.g., a keyboard, or trackballs, keypads, touch screens, and voice recognition devices.

As further shown in FIG. 1, the computer 12 includes an LFSR module 30 which may be executed by the computer 12 as a series of computer-executable instructions. These instructions may reside, for example, in main memory of the microprocessor 12.

Figure 2:
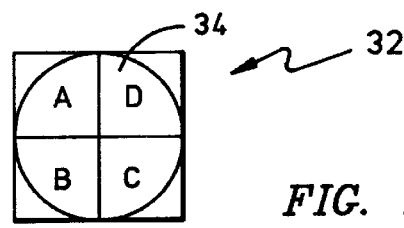
FIG. 2 is a schematic diagram of a program storage device.

Alternatively, the instructions may be contained on a data storage device with a computer readable medium, such as the computer diskette 32 shown in FIG. 2. Other data storage devices on which the instructions may be stored include a DASD array, magnetic tape, conventional hard disk drive, electronic read-only memory, optical storage device, a node in a network, or other appropriate data storage device.

Figure 5:
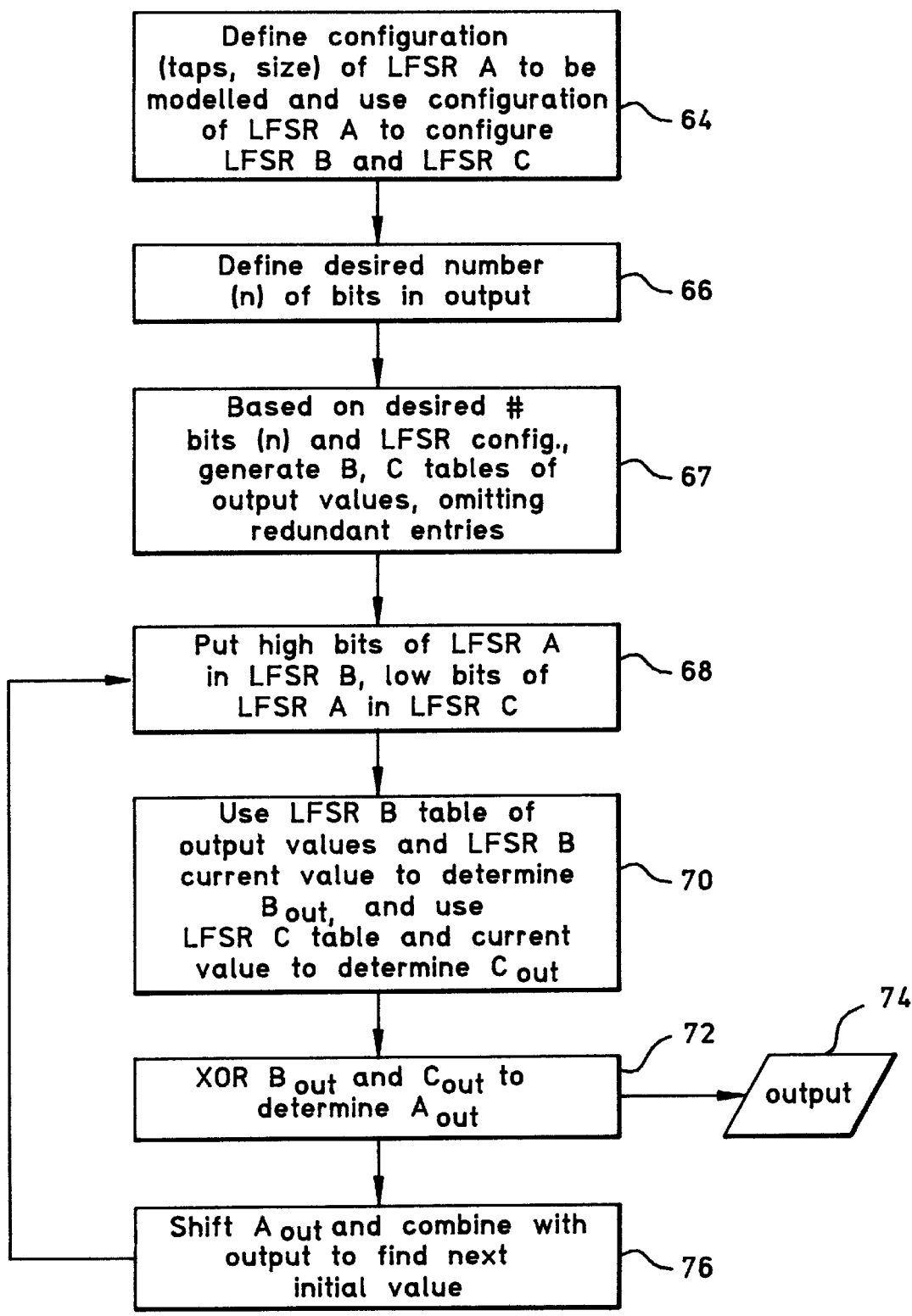
FIG. 5 is a flow chart of the steps of the present invention in using logical model LFSRs to quickly and space-efficiently determine the output of the LFSR shown in FIG. 3.

In an illustrative embodiment of the invention, the computer-executable instructions may be lines of compiled C or C++ code, as set forth below. FIG. 5 and Table I illustrate the logic and structure of such instructions, as embodied in a computer program. Those skilled in the art will appreciate that FIG. 5 illustrates the logic of computer program code elements that function according to this invention. Manifestly, the invention is practiced in its essential embodiment by a machine component that renders the computer program code elements in a form that instructs a programmable digital processing apparatus (that is, a computer) to perform a sequence of function steps corresponding to those shown in FIG. 5. One example of such a machine component is shown in FIG. 2 as a combination of program code elements A–D in computer readable form that are embodied in a computer-usable data medium 34, on the computer diskette 32. As mentioned above, however, such media may also be embodied in many other forms.

Figure 3:
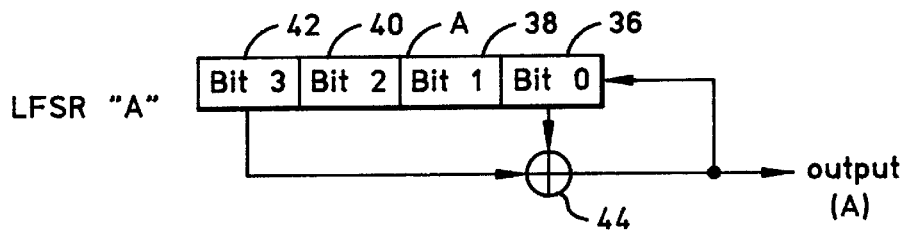
FIG. 3 is a schematic diagram of an LFSR to be modelled.
Figure 4:
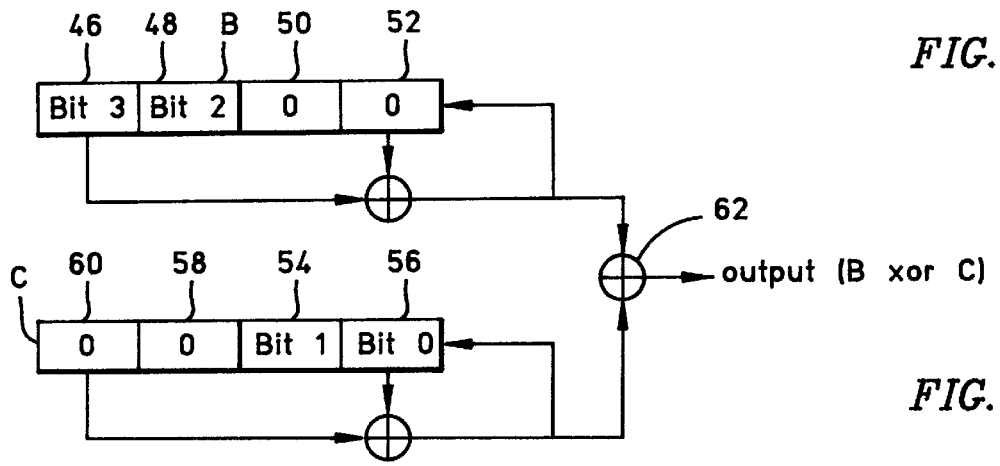
FIG. 4 is a schematic diagram of the model LFSRs.

In understanding the principles of the present invention, reference is now made to FIGS. 3 and 4. FIG. 3 shows a four-bit linear feedback shift register (LFSR) "A" having first through fourth cells 36, 38, 40, 42, with each cell containing a binary bit having a value of either zero (0) or one (1). It is to be understood that while a four bit LFSR is shown for clarity of disclosure, the number of bits in the LFSR could be more than four. For example, the LFSR "A" could hold twenty-one or more bits. In the four bit embodiment shown, the initial value of the LFSR "A" could be any one of $2^4$=sixteen possible values.

As shown in FIG. 3, the cells 36–42 of the LFSR "A" are initially filled with bits having values that together establish an initial LFSR value. More specifically, the first cell 36 contains a $bit_0$ having an initial value, the second cell 38 contains a $bit_1$ having an initial value, the third cell 40 contains a $bit_2$ having an initial value, and the fourth cell 42 contains a $bit_3$ having an initial value. For each clock cycle that is established by the clock 18 shown in FIG. 1, the bits in the LFSR "A" move, i.e., shift, to the next highest cell, with the bit in the fourth cell 42 being input to an exclusive OR logic element 44 as disclosed further below. Thus, in the embodiment shown in FIG. 3, the bits move from right to left through the LFSR "A", with the most recently output bit being input to the first cell 36.

As shown in FIG. 3, the LFSR "A" is an LFSR that defines a configuration in which two bits of the LF SR are compared using an exclusive OR logic element to establish an output bit that is fed back into the LFSR "A" as the next input bit. More particularly, in the example shown in FIG. 3, the bit in the first cell 36 is combined with the bit in the fourth cell 42 by the exclusive OR logic element 44. In the example shown, contents of the first and fourth cells 36, 42 of the LFSR "A" are fed by "taps" of the LFSR to inputs of the logic element 44.

It can be appreciated in reference to FIG. 3 that the result of the exclusive OR logic element 44 establishes the output of the LFSR "A" and also the input bit for the next subsequent register shift defined by the clock 18. Accordingly, for the first shift of the LFSR "A", the value of $bit_0$ is combined with the value of $bit_3$ by the logic element 44.

In accordance with exclusive OR principles, when the binary value of the bit from the first cell 36 equals the binary value of the bit from the fourth cell 42, the output bit of the logic element 44 has a value of zero (0); otherwise, the output bit has a value of one (1). It further will be appreciated that the output bits from several register shifts can be combined to establish a byte. For example, the output bit sequence of eight register shifts can establish an eight bit byte.

As understood by the present invention, it happens that the output bit of the LFSR "A" is the same as the result of an exclusive OR operation undertaken on the output bits of two or more model LFSRs, each of which is identical in configuration the LFSR "A", i.e., each of which has the same number of elements and same tap points as the LFSR "A", provided that the model LFSRs are shifted together and have initial bit values that are related to the initial bit value of the LFSR "A" as follows. The initial bit values of the model LFSRs are established such that a bitwise exclusive OR operation performed on the initial bit values of the model LFSRs yields the binary value represented by the initial bits of the "A" LFSR. When the above conditions are met, the value of the bit that results from the exclusive O-Ring of the outputs of the model LFSRs always and forever equals the value of the bit that would be output during the same clock cycle from the LFSR "A".

A simplified example of such a model circuit is shown in FIG. 4, wherein a model LFSR "B" and a model LFSR "C" are provided. In accordance with the present invention, the "B" and "C" LFSRs are model LFSRs that can be implemented in hardware or, more preferably, in software, as more fully set forth below. In any case, the "B" LFSR initially contains a first subset of the initial bits in the "A" LFSR, and the "C" LFSR initially contains a second subset of the initial bits in the "A" LFSR.

In the preferred embodiment shown, the "B" LFSR initially contains the initial values of the two higher order bits of the "A" LFSR ($bit_3$ and $bit_2$), and these bits are in fourth and third cells 46, 48, respectively, of the "B" LFSR. The first and second cells 50, 52 of the "B" LFSR are initially filled with logical zeroes. In contrast, the "C" LFSR initially contains the initial values of the two lower order bits ($bit_1$ and $bit_0$) of the "A" LFSR, and these two bits are in the second and first cells 54, 56, respectively, of the "C" LFSR. The third and fourth cells 58, 60 of the "C" LFSR are initially filled with logical zeroes, as shown. Accordingly, it will be readily seen that a bitwise exclusive OR operation performed on the "B" and "C" LFSRs, by an output logic element 62, such that $bit_3$ of the B LFSR is exclusive Ored with $bit_3$ of the C LFSR, $bit_2$ of the B LFSR is exclusive Ored with $bit_2$ of the C LFSR, and so on, yields the four bits ($bit_3$, $bit_2$, $bit_1$, $bit_0$) of the A LFSR.

It is to be understood that while the bits of the "A" LFSR preferably are allocated evenly between the "B" and "C" LFSRs, one of the "B" and "C" LFSRs initially can contain three of the initial bit values of the LFSR "A", while the other contains the other initial bit value of the "A" LFSR, with the remaining cells of the model LFSRs initially containing zeroes. It is to be further understood that the principles herein apply to more than two model LFSRs. For example, for a twelve element LFSR to be modelled, three model LFSRs can be provided, with every third initial bit value of the LFSR to be modelled being contained in its corresponding cell in a respective one of the three model LFSRs, and with the initial values of the remaining bits of the model LFSRs being set to zero.

While the above-disclosed model LFSRs can be implemented in hardware, as envisioned herein they are preferably implemented in software in the form of an LFSR module 30, using the logic shown in FIG. 5, which will now be explained with reference to the entries shown in Table II below. Commencing at block 64 in FIG. 5, the configuration of the LFSR to be modelled is defined. Thus, using the example "A" LFSR shown in FIG. 3, at block 64 the first through fourth cells 36–42 of the LFSR "A" would be defined along with the taps of the LFSR.

Next, at block 66 the number (n) of desired output bits is defined. Thus, for example, it might be desired to receive the output bits that would be produced by the first eight shifts of the LFSR to be modelled, and this number is defined at block 66.

In such an instance, the skilled artisan will recognize that the size of the output would be eight bits. While the discussion below focuses on a single value of "n", however, additional tables could be constructed that yield results for other values of "n". For example, sixteen bit or thirty two bit results could be specified at block 66.

Next, in block 67, the output value tables for the "B" and "C" LFSRs are generated, based upon (n), and omitting redundant entries. These are the fourth and fifth columns of Table II.

Specifically, in block 67 the fourth column of Table II (referred to as a "B" table) is initialized based on the desired number (n) of bits defined at block 66, the "B" LFSR configuration defined at block 64, and the possible initial values of the "B" LFSR. More specifically, for each of the sixteen possible initial values from the second column of Table II that correspond to a respective one of the sixteen possible initial values of the A LFSR defined at block 64, the process determines what the first output bit would be from the model "B" LFSR. Then, based on the defined LFSR configuration, the logic determines what the output bit would be for the next register shift, and so on, until "n" bit values have been determined by determining the output results of "n" shifts of the model LFSR "B". These "n" bit values are listed in sequence as shown in the fourth column of Table II, for each of the sixteen (in the present example) possible initial values. It is to be understood that the fifth column of Table II (which fifth column establishes a "C" table) is likewise initialized based on the desired number (n) of bits defined at block 66, the "C" LFSR configuration defined at block 64, and the initial state of the "C" LFSR.

In accordance with the present invention, while Table II below lists all sixteen entries in columns four and five for disclosure purposes, duplicative entries are preferably omitted during indexing of Table II. Thus, for example, only the first entry of the first four entries of the fourth column (i.e., the "B" table) need be stored, because the remaining three entries in that group are all equal to the first entry. The first four possible "B" LFSR values from column two would point to the first entry in column four. Likewise, only one entry in the second four entries of column four need be stored, and so on.

In the case of the fifth column, representing the output of the C LFSR, the first, fifth, ninth, and thirteenth entries are equal; thus, only the first entry need be considered when indexing Table II, and the remaining entries ignored. For the C LFSR, the first, fifth, ninth, and thirteenth possible initial bit values from column three (i.e., the "C" table) would point to the same output entry from column five. Likewise, only the second, third, and fourth values from column five need be stored, because the remaining values of column five are equal to one of the first four values as shown.

The advantageous implications of the present invention can now be fully appreciated. To simulate a twenty bit LFSR in software, without the benefit of present principles a single table for producing 8 bits per iteration would have a size of $2^{20}$ bytes (i.e., more than a million bytes). With the present invention, however, two tables would be required (i.e., columns four and five in Table II), but each table would have a size of only $2^{10}$ bytes, or 1,024 bytes, which together are only $\frac{1}{512}$ as large as a single table otherwise would be.

Continuing to block 68, the model LFSRs are logically constructed following the principles set forth above by replicating the logical configuration of the LFSR to be modelled, and then, for each of the 16 possible initial bit value combinations of the "A" LFSR, placing a first subset of the initial bit values into the corresponding cells of a first model LFSR. Also, for each of the 16 possible initial states of the "A" LFSR, a second subset of the initial bit values are placed into the corresponding elements of a second model LFSR, and so on. In the example shown in FIG. 4, the higher order bits defined at block 64 are placed in the corresponding high bits of the "B" LFSR and the lower order bits defined at block 64 are placed in the corresponding bits of the "C" LFSR.

The results of the above steps are shown in the first five columns of Table II, with the second and third columns essentially establishing the model LFSRs ("B" and "C"). The first column lists the sixteen possible initial values, i.e., bit combinations, for the "A" LFSR. For disclosure purposes, the values are set forth in both hexadecimal notation and binary notation. The second column sets forth the values of the bits of the "B" LFSR that correspond to the sixteen initial values in the first column. As shown, the two higher order bits from the first column (i.e., from the LFSR to be modelled) are duplicated in the two higher order elements in the second column (i.e., in the higher order elements of the high order "B" LFSR). The two lower elements of the "B" LFSR are set equal to zero (0) for all sixteen possible initial values of the "A" LFSR.

In contrast, the third column of Table II sets forth the values of the bits of the "C" LFSR that correspond to the sixteen initial values in the first column. As shown, the two lower order bits from the first column (i.e., from the A LFSR) are duplicated in the two lower order elements in the third column (i.e., in the lower order elements of the low order model C LFSR). The two higher elements of the low order model LFSR "C" are set equal to zero (0) for all sixteen possible initial values of the "A" LFSR.

Additionally, as mentioned above, more than two model LFSRs (i.e., more than two tables) can be defined at block 64 to model the output of the A LFSR. Using more than two tables can facilitate storing all the lookup tables in the high speed data cache 14 of the microprocessor 12, without requiring accessing the relatively slower main memory 13. For example, in the case of a 25 bit LFSR on an Intel Pentium® processor, assuming 32 bit wide tables are desired, using three model LFSRs (respectively incorporating 8, 8, and 9 of the initial bits) permits the tables to be stored entirely in the data cache, whereas using two model LFSRs (respectively incorporating 12 and 13 of the initial bits) does not permit the tables to be stored in cache. Under these circumstances, the performance gain realized from using three tables in cache versus using two tables in main memory dwarfs the cost of the extra table lookup required when using three tables instead of two.

In block 70, the LFSR B table of output values (column 4 of Table II, for example) and the current value of LFSR B are used to determine $B_{out}$. In this regard, the current value of LFSR B (in column 2) indexes to the output value in column 4 that represents the output value of the B LFSR. Similarly, the current value of the C LFSR in column 3 indexes to the output value of the C LFSR output in column 5.

Once the outputs of the model LFSRs have been determined and obtained from columns four and five, the output of the A LFSR to be modelled is determined at block 72 by combining outputs of the B and C LFSRs. According to the example of FIG. 3, the combination is embodied in a bitwise exclusive OR operation on the entries from columns four and five, which generates column six. Accordingly, when an output is desired, a value equivalent to one in column 6 can instead be produced in a few clock cycles by indexing the two values in columns 4 and 5, which are much smaller tables.

The output value derived in block 72 from exclusive ORing the outputs of the model LFSRs is output at block 74. Also, the output value of block 72 is sent to block 76, wherein it is combined with the left-shifted current value of LFSR "A" to determine the LFSR "A" initial value for the next bits to be produced, should any additional bits be desired.

The above-disclosed logic can be implemented in C code as set forth in table I, wherein the variable "BITS" is the number of cells in the LFSR to be modelled. The code below produces 8 bits per iteration. It is to be understood, however, that more than eight bits (for example, sixteen bits or thirty two bits) per iteration can be produced by increasing the width of the "B" and "C" tables.

TABLE I

```
#define MASK ((1<<(BITS/2))-1)
void LFSR(
    long A, /* the initial value of the LFSR */
    unsigned char*out, /* output of the LFSR put here */
    int bytes) /* number of bytes of output to put at 'out' */
{
    static unsigned char hitable[MASK+1]; /* B lookup table */
    static unsigned char lowtable[MASK+1]; /* C lookup table */
    /* tables are 1<<(BITS/2) in size */
    long B = A >> (BITS/2); /* B register from Figure 4, shifted right by
                               BITS/2 to index the table */
    Long C = A & MASK; /* C register from Figure 4 */
    while (--bytes >= 0) {
        *out = lowtable[C] ^ hitable[B];
        C = (C << 8) + *out; /* begin reassembling 'A' */
        B = MASK & ((B << 8) + (C >> (BITS/2)));
        C &= MASK;
        out++;
    }
}
```

When the value of BITS is odd, two MASK values would be used, one with the B register and one with the C register.

While the particular embodiment herein shown and described in detail is fully capable of attaining the above-described objects of our invention, it is to be understood that it is only a preferred embodiment, and is thus representative of subject matter that is broadly contemplated by the invention. Therefore, the scope of our invention fully encompasses other embodiments which may become obvious to those skilled in the art, and is accordingly to be limited by nothing other than the appended claims.

TABLE II

| $Value_A$ | $Value_B$ | $Value_C$ | $Out_B$ | $Out_C$ | $Out_B$ XOR $Out_C$ |
|---|---|---|---|---|---|
| 0 (0000) | 0 (0000) | 0 (0000) | 00 (00000000) | 00 (00000000) | 00 (00000000) |
| 1 (0001) | 0 (0000) | 1 (0001) | 00 (00000000) | eb (11101011) | eb (11101011) |
| 2 (0010) | 0 (0000) | 2 (0010) | 00 (00000000) | 3d (00111101) | 3d (00111101) |
| 3 (0011) | 0 (0000) | 3 (0011) | 00 (00000000) | d6 (11010110) | d6 (11010110) |
| 4 (0100) | 4 (0100) | 0 (0000) | 7a (01111010) | 00 (00000000) | 7a (01111010) |
| 5 (0101) | 4 (0100) | 1 (0001) | 7a (01111010) | eb (11101011) | 91 (10010001) |
| 6 (0110) | 4 (0100) | 2 (0010) | 7a (01111010) | 3d (00111101) | 47 (01000111) |
| 7 (0111) | 4 (0100) | 3 (0011) | 7a (01111010) | d6 (11010110) | ac (10101100) |
| 8 (1000) | 8 (1000) | 0 (0000) | f5 (11110101) | 00 (00000000) | f5 (11110101) |
| 9 (1001) | 8 (1000) | 1 (0001) | f5 (11110101) | eb (11101011) | 1e (00011110) |
| a (1010) | 8 (1000) | 2 (0010) | f5 (11110101) | 3d (00111101) | c8 (11001000) |
| b (1011) | 8 (1000) | 3 (0011) | f5 (11110101) | d6 (11010110) | 23 (00100011) |
| c (1100) | c (1100) | 0 (0000) | 8f (10001111) | 00 (00000000) | 8f (10001111) |
| d (1101) | c (1100) | 1 (0001) | 8f (10001111) | eb (11101011) | 64 (01100100) |
| e (1110) | c (1100) | 2 (0010) | 8f (10001111) | 3d (00111101) | b2 (10110010) |
| f (1111) | c (1100) | 3 (0011) | 8f (10001111) | d6 (11010110) | 59 (01011001) |

We claim:

1. A computer including a data storage device including a computer usable medium having computer usable code means for modelling the output of a linear feedback shift register (A LFSR) having a predetermined logical configuration for shifting bits, the computer usable code means having:

computer readable code means for generating at least two model LFSRs, each model LFSR having the same logical configuration as the A LFSR, a first model LFSR ("B LFSR") containing a subset B of the bits of the A LFSR and a second model LFSR ("C LFSR") containing a subset C of the bits of the A LFSR;

first computer readable code means for providing B and C tables, the B table representing at least the output of the B model LFSR after a predetermined number "n" of register shifts, the C table representing at least the output of the C model LFSR after the predetermined number "n" of register shifts;

second computer readable code means for accessing the tables to retrieve a B output value and a C output value; and third computer readable code means for combining the B output value and the C output value to render a modelled output of the A LFSR.

2. The computer of claim 1, wherein the second computer readable code means accesses the tables based on an initial A value.

3. The computer of claim 1, wherein the third computer readable code means for combining compares the B output value with the C output value using a bit-wise exclusive OR operation.

4. The computer of claim 3, wherein the subset B includes higher order bits of the A LFSR and the subset C includes lower order bits of the A LFSR.

5. The computer of claim 1, wherein the number of bits in the B LFSR is no more than one (1) more or less than the number of bits in the C LFSR.

6. The computer of claim 1, wherein the computer includes a data cache and a main memory, the computer readable code means generates a plurality of said model LFSRs, and the first computer readable code means provides a plurality of tables , each of said plurality of tables representing at least the output of a model LFSR, all of said plurality of tables being stored in the data cache.

7. The computer of claim 1, in combination with a digital video disk device.

8. The combination of claim 7, in further combination with a personal computer.

9. A computer-implemented method for determining the output of an A linear feedback shift register (A LFSR) defining a configuration and having bits, comprising the steps of:

producing at least a B LFSR counterpart of the A LFSR and a C LFSR counterpart of the A LFSR, each counterpart including at least a subset of the bits of the A LFSR; and combining the output of the B LFSR with the output of the C LFSR using a bitwise exclusive OR operation to thereby determine the output of the A LFSR.

10. The computer-implemented method of claim 9, wherein at least the B and C LFSRs are model LFSRs embodied in computer-executable code, the B LFSR containing a subset of bits B of the A LFSR and the C LFSR containing a subset of bits C of the A LFSR, and wherein the method further comprising the steps of:

providing B and C tables respectively representing at least the outputs of the B and C LFSRs after a predetermined number "n" of register shifts;

accessing the B and C tables to retrieve respective B and C output values; and combining the B output value and the C output value to determine the output of the A LFSR.

11. The computer-implemented method of claim 10, wherein the tables are accessed based on an initial A value.

12. The computer-implemented method of claim 11, wherein subset B includes higher order bits of the A LFSR and subset C includes lower order bits of the A LFSR.

13. The computer-implemented method of claim 12, wherein the number of bits in the B LFSR is no more than one (1) more or less than the number of bits in the C LFSR.

14. The computer-implemented method of claim 13, including a plurality of said model LFSRs and a plurality of tables corresponding to said model LFSRs, all of said tables being stored in a data cache of a computer.

15. A computer program device comprising:

a computer program storage device readable by a digital processing apparatus; and a program means on the program storage device and including instructions executable by the digital processing apparatus for determining the output of an A linear feedback shift register (A LFSR) having a configuration and having one of a plurality of initial LFSR values, each value being defined by respective bits of the A LFSR, the method steps comprising:

generating plural model LFSRs, each model LFSR having a respective subset of the bits of the A LFSR;

generating respective data tables based on the model LFSRs, each data table representing model output values of a respective model LFSR after a predetermined number of shifts; and determining the output of the A linear feedback shift register by combining the model output values.

16. The computer program device of claim 15, wherein replicating includes generating at least B and C LFSRs, the B LFSR including a subset B of the bits of the A LFSR and the C LFSR including a subset C of the bits of the A LFSR, the model output values including a B LFSR output value and a C LFSR output value.

17. The computer program device of claim 16, wherein determining includes accessing the tables based on an initial A value.

18. The computer program device of claim 16, wherein determining includes combining the B LFSR output value with the C LFSR output value using a bit-wise exclusive OR operation.

19. The computer program device of claim 16, wherein the subset B includes higher order bits of the A LFSR and the subset C includes lower order bits of the A LFSR.

20. The computer program device of claim 16, wherein the number of bits included in the B LFSR is no more than one (1) more or less than the number of bits included in the C LFSR.

21. The computer program device of claim 15, wherein the digital processing apparatus includes a data cache and a main storage, and the method includes generating a number of model LFSRs such that tables corresponding to the model LFSRs can all be stored in the data cache.

22. The computer program device of claim 15, in combination with a digital video disk device.

23. The combination of claim 22, in further combination with a personal computer.

24. A computer including computer readable instructions executable by the computer for performing method steps for determining the output of a linear feedback shift register (LFSR) defining a configuration and having one of a plurality of initial LFSR values, each value being defined by a respective sequence of at least first bits and second bits, the method steps comprising:

for each initial LFSR value, replacing the first bits with zeroes to establish first model values;

determining first outputs of the LFSR for each first model value;

storing in a first table only non-duplicative first outputs;

for each initial LFSR value, replacing the second bits with zeroes to establish second model values;

determining second outputs of the LFSR for each second model value;

storing in a second table only non-duplicative second outputs; and determining the output of the LFSR by accessing the first table to retrieve a first test output, accessing the second table to retrieve a second test output, and undertaking a bitwise exclusive OR operation on the first and second test outputs.

25. The computer of claim 24, wherein the number of first bits is no more than one (1) more or less than the number of second bits.

26. The computer of claim 24, wherein the computer includes a data cache and a main storage memory, and the method steps generate a plurality of tables, all of the plurality of tables being stored in the data cache and accessed without accessing the main storage memory.

27. The computer of claim 24, in combination with a digital video disk device.

28. The combination of claim 27, in further combination with a personal computer.

29. A method for determining the output of an A linear feedback shift register (A LFSR) defining a configuration and having bits, comprising the steps of:

providing at least a B LFSR counterpart of the A LFSR and a C LFSR counterpart of the A LFSR, each counterpart including at least a subset of the bits of the A LFSR; and combining the output of the B LFSR with the output of the C LFSR using a bitwise exclusive OR operation to thereby determine the output of the A LFSR.

30. The method of claim 29, wherein the B and C LFSRs comprise respective hardware devices.

* * * * *